United States Patent [19]
Henderson et al.

[11] Patent Number: 5,353,549
[45] Date of Patent: Oct. 11, 1994

[54] MOLDED WEATHERSTRIP AND METHOD

[75] Inventors: Jack V. Henderson, Bloomfield Hills; Paul J. Fair, Troy, both of Mich.

[73] Assignee: The Standard Products Company, Cleveland, Ohio

[21] Appl. No.: 972,592

[22] Filed: Nov. 6, 1992

[51] Int. Cl.⁵ ............................................. E06B 7/16
[52] U.S. Cl. ................................ 49/490.1; 49/377; 49/492.1
[58] Field of Search .................. 49/492.1, 490.1, 377; 52/716.5, 716.1, 716.6, 716.7

[56] References Cited

U.S. PATENT DOCUMENTS

| | | |
|---|---|---|
| 4,696,128 | 9/1987 | Fukuhara . |
| 4,835,031 | 5/1989 | Schröder et al. ............ 49/490.1 X |
| 4,969,303 | 11/1990 | Emmons . |
| 4,975,306 | 12/1990 | Jackson . |
| 4,976,068 | 12/1990 | Keys ............... 49/490.1 X |
| 5,085,024 | 2/1992 | Emmons et al. . |
| 5,123,693 | 6/1992 | Karashima et al. ........... 49/490.1 X |
| 5,147,105 | 9/1992 | Ono et al. ........ 49/490.1 X |

*Primary Examiner*—Philip C. Kannan
*Attorney, Agent, or Firm*—Harness, Dickey & Pierce

[57] ABSTRACT

A weatherstrip for attachment to the body of a vehicle having a flange edge, such as a door, is located at an interface between the flange edge and a movable window. The weatherstrip consists of a longitudinally extending molding formed by an injection molding process which has in cross-section a first and second leg joined together by a web to define a U-shaped and a first channel between the first and second legs. At least one retainer clip may be integrally formed with the molding to define a second channel which is smaller than the first channel for accepting the flange edge.

16 Claims, 2 Drawing Sheets

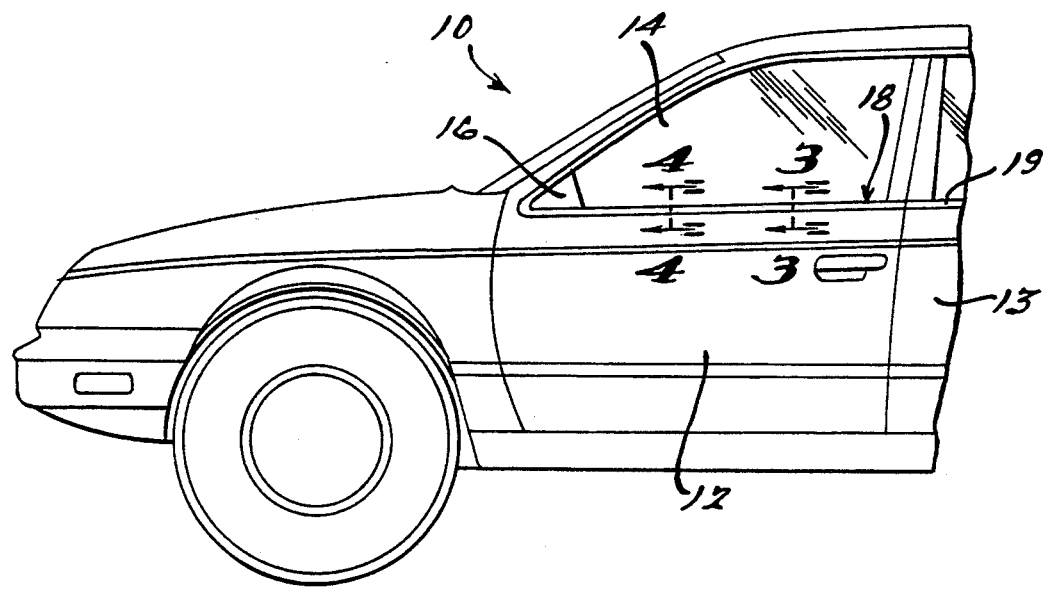
FIG. 1.
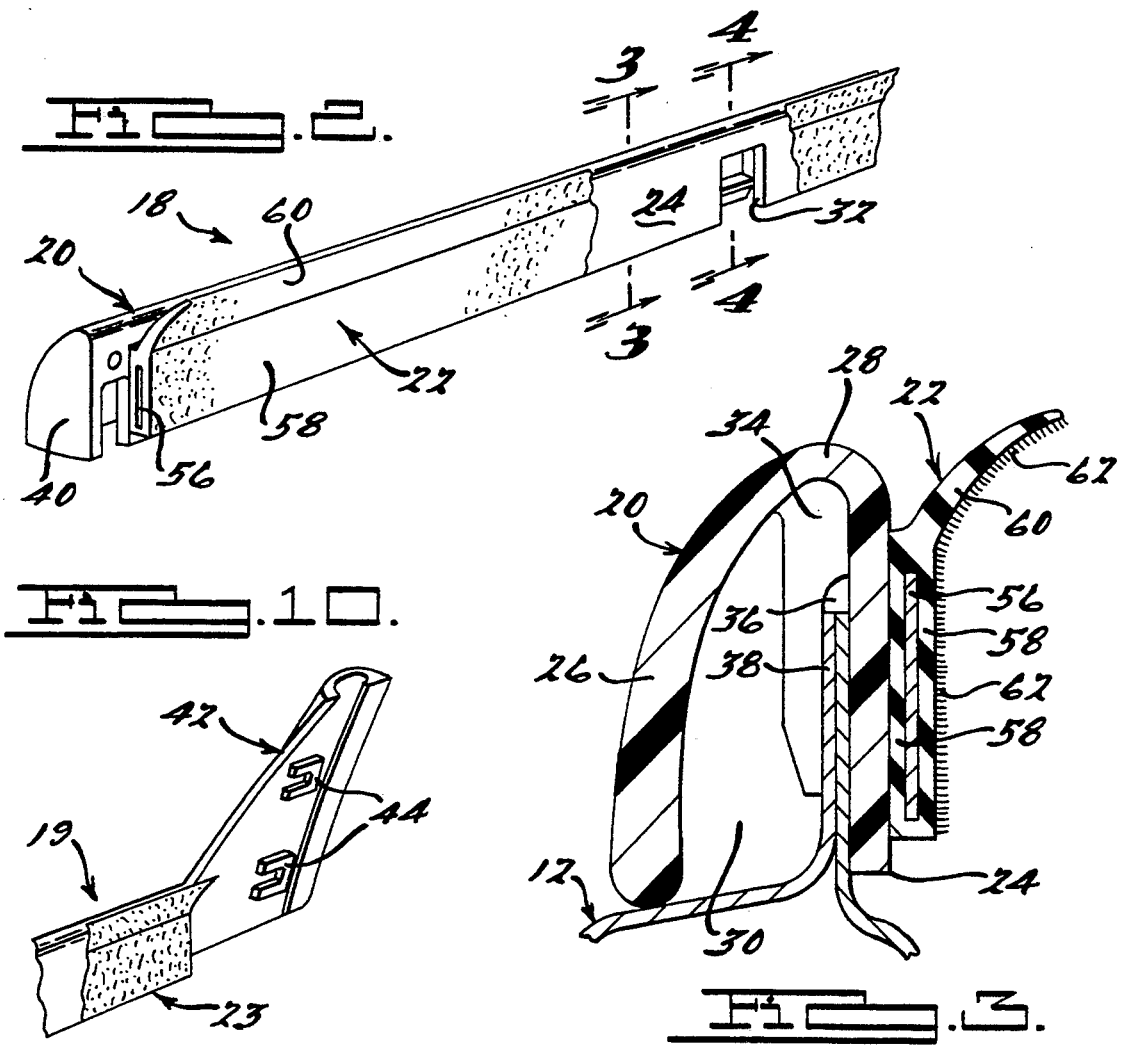
FIG. 2.
FIG. 10.
FIG. 3.

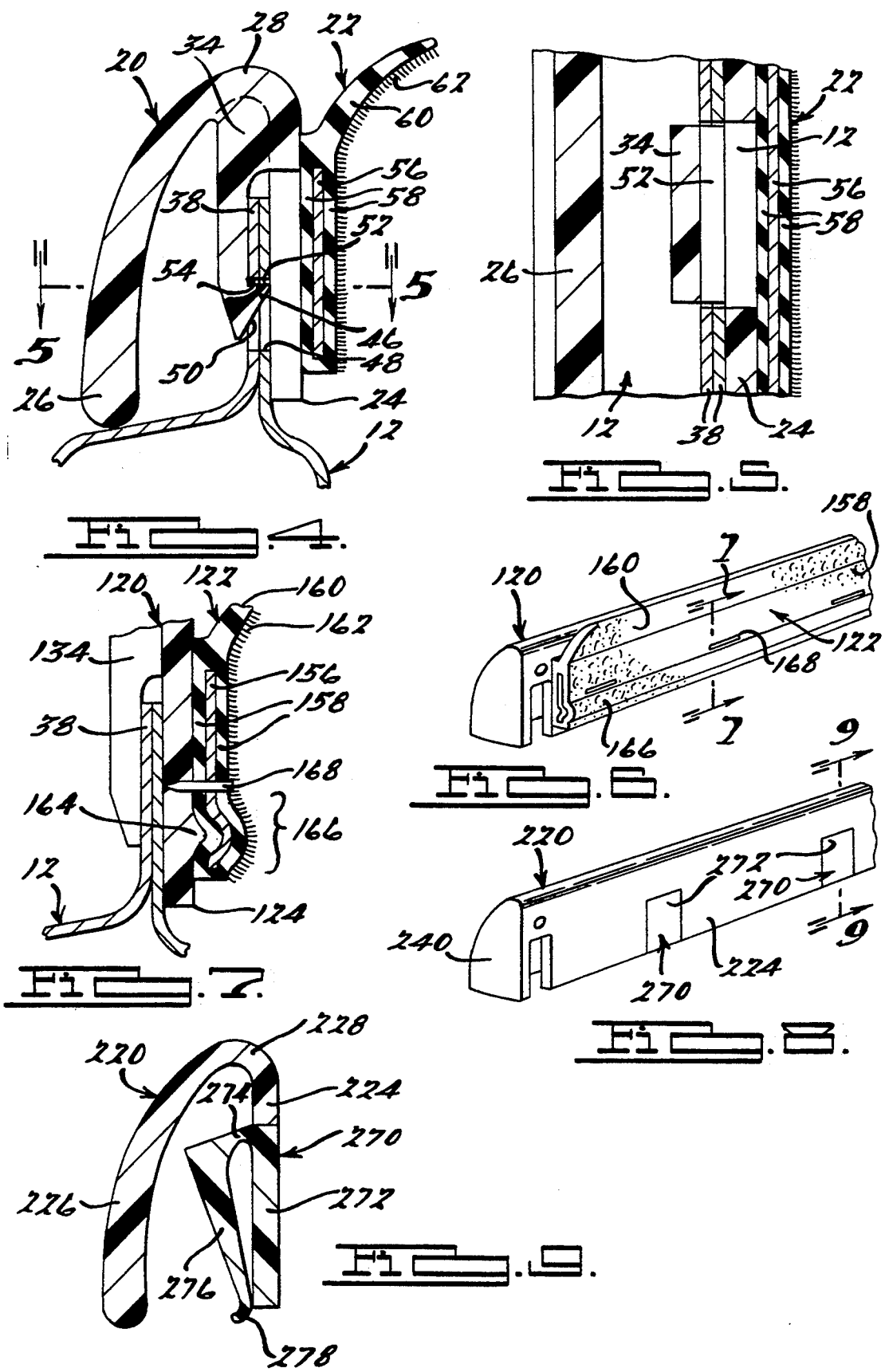

MOLDED WEATHERSTRIP AND METHOD

BACKGROUND OF THE INVENTION

1. Technical Field:

This invention relates generally to a weatherstrip molding, and more particularly to an injection molded weatherstrip molding for the interface between a vehicle body and a movable window.

2. Discussion:

Almost all automobiles, and some other vehicles, are equipped with movable windows adapted to slide from an extended and closed position to a open position which is retracted within the body of the vehicle. The movable window is usually affixed to a door of the vehicle. The interface between the vehicle body and the movable window is generally equipped with a weatherstrip for aesthetically hiding the interface, as well as providing a squeegee-type blade for cleaning the window as it is extended and retracted.

Belt weatherstrips are generally extruded or roll-formed in a complicated manufacturing process having many steps. First, a core metal structure is formed having a longitudinally extending inverted U-shape. In cross-section, each of the two legs of this core metal structure may be formed with flanges for strength. The core metal structure is then coated with an extruded layer of synthetic elastomeric material. The coated core metal extrusion is then cut to length. A sealing strip having a flexible blade for contacting the window may be formed of a flat longitudinally extending metal strip which is then coated in an extrusion process with rubber or similar material to form a base strip. An extruded rubber blade is concurrently formed, extending obliquely beyond the coated metal base strip. An inner surface of the blade is generally flocked to provide a low friction coating for reducing friction between the blade and the window. The resulting sealing strip is then affixed to the U-shaped belt molding. The first leg of the belt molding and of the base portion of the sealing strip are then notched at longitudinally spaced locations. A number of clips are then inserted in the notches to mutually affix the belt molding, sealing strip, and the clips. The clips are also formed for accepting and gripping a flange edge formed on the door of the vehicle. In addition, a separate end cap is generally formed independently and affixed to one end of the weatherstrip molding. At the other end of the belt molding, a separately formed mirror patch or window pillar or other detail is affixed to the weatherstrip molding by a joint line.

This complicated assembly process involves many separate steps and results in an expensive and aesthetically ungainly product. In addition, the accumulation of tolerance values for each individual part and the weatherstrip subassembly may cause significant variations in dimensions of the weatherstrip. It is therefore desirable to provide a weatherstrip molding and method for forming it which is simpler, more cost effective, and involves fewer steps.

SUMMARY OF THE INVENTION

According to a preferred embodiment of the present invention, a weatherstrip molding is disclosed for attachment to the body of a vehicle, such as a door, having a flange edge. The weatherstrip molding is located at a interface between the flange edge and a movable window which may be raised or lowered to a closed or open position respectively. The weatherstrip molding consists of a longitudinally extending molding which is formed by an injection molding process. The molding has in cross-section a first and second leg joined together by a web to define a U-shape and a first channel between the first and second legs. At least one retainer clip may be integrally formed with the molding to define a second channel which is smaller than the first channel for accepting the flange edge. The clip is preferably integrally molded at the same time as the remainder of the molding is formed. Alternatively, the clip may be pre-formed and inserted into the mold before the injection molding process, during which the molding is then molded around the clip, whereby the clip becomes integral with the remainder of the molding.

These and other various advantages and features of the present invention will become apparent from the following description and claims, in conjunction with the appended drawings:

BRIEF DESCRIPTION OF THE DRAWINGS

FIG. 1 is a partial side elevation of an automobile;

FIG. 2 is a partial perspective view of a weatherstrip molding according to the present invention, and a cut-away view of an attached sealing strip;

FIG. 3 is a cross-sectional view of a weatherstrip molding according to the present invention affixed to a flange edge of an automobile door taken along line 3—3 in FIGS. 1 and 2;

FIG. 4 is a cross-sectional view similar to that in FIG. 3 taken along line 4—4 in FIGS. 1 and 2;

FIG. 5 is a cross-sectional view of a weatherstrip molding according to the present invention taken along line 5—5 in FIG. 4;

FIG. 6 is a partial perspective view of an alternative embodiment of the present invention;

FIG. 7 is a cross-sectional view of the weatherstrip molding of FIG. 6 taken along line 7—7;

FIG. 8 is a partial perspective view of a second alternative embodiment of the present invention;

FIG. 9 is a cross-sectional view of the weatherstrip molding of FIG. 8 taken along line 9—9; and FIG. 10 is a partial perspective view of a third alternative embodiment of the present invention.

DETAILED DESCRIPTION OF THE PREFERRED EMBODIMENTS

The following description of the preferred embodiments is merely exemplary in nature, and is in no way intended to limit the invention, or its application or uses.

With reference to the drawings, FIG. 1 shows a partial side elevation of an automobile 10 having a door 12, a movable window 14, a mirror patch 16, and a weatherstrip 18 attached to door 12 at an interface between window 14 and door 12. Weatherstrip 18 extends longitudinally along the lower edge of window 14 and operates to aesthetically conceal the interface between door 12 and window 14. Window 14 may be slidingly moved between an extended and closed position, as is shown in FIG. 1, and a retracted and open position.

Weatherstrip 18 of the present invention is shown in FIGS. 2 through 5, and consists of a weatherstrip molding 20, as well as an attached sealing strip 22. The novel weatherstrip molding 20 of the present invention extends longitudinally and has, in cross-section, a first and second leg 24 and 26 joined together by a web 28 defining an inverted U-shape and a first channel 30 between first leg 24 and second leg 26.

In the embodiment shown in FIGS. 3 and 4, molding 20 is formed with at least one notch 32, and at least one retainer clip 34 preferably formed as a tab located longitudinally adjacent or opposite to notch 32 extending downwards from web 28 substantially parallel to first leg 24. Retainer clip 34 defines a second channel 36 between the longitudinally spaced inner surfaces of clip 34 and first leg 24 for accepting a flange edge 38 of door 12. Second channel 36 is of course smaller than first channel 30, because clip 34 extends between first and second legs 24 and 26.

Clip 34 is preferably formed with a ramped projection 46 having an angled lead-in surface 50 for facilitating installation of molding 20 onto flange edge 38 and a catch surface 52 for inhibiting subsequent removal of molding 20 by engaging a thrust bearing surface 54 created by an aperture 48 formed in flange edge 38. Clip 34 may also be formed with an interference fit with first leg 24, such that a portion of clip 34 extends into notch 32 for an enhanced and more secure fit onto flange edge 38.

Weatherstrip molding 20 may be integrally formed with a laterally and transversely extending end wall 40 as shown in FIG. 2, rather than a separately formed end cap, for enclosing the weatherstrip assembly at the opening end of front door 12. At the opposite end of molding 20, an end detail may be integrally formed, such as for example a mirror patch 16, as shown in FIG. 1. Mirror patch 16 is a triangular shaped portion for cooperating with a rear-view mirror located at the front of front window 14. In addition, the weatherstrip molding of the present invention may be formed as a rear weatherstrip molding 19 as shown in FIG. 10 for use on a rear door 13. Rear molding 19 may be formed with a more complicated end detail, such as a rear corner filler 42, which may also be formed with fastening means 44 for fastening rear corner filler 42 onto the body of automobile 10. Rear molding 19 may also be formed in a curved shape to follow the contours of doors 12 and 13.

Weatherstrip 18 includes sealing strip 22 which is affixed to first leg 24 of weatherstrip molding 20. Sealing strip 22 has a longitudinally extending metal base plate 56 which is surrounded by an extruded coating 58 of rubber or similar material, as well as a blade portion 60 extending obliquely upward and inward for contacting window 14. An inner surface of sealing strip 22 is flocked by a method known in the art with flocking material 62 which provides a low friction coating for reducing friction between blade 60 and window 14. Flocking material 62 may be placed only on the inner surface of blade portion 60, as opposed to the entire inner surface of sealing strip 22. Sealing strip 22 may be affixed to molding 20 by a variety of methods generally known in the art, such as with an adhesive. Sealing strip 22, especially blade portion 60, provides a seal between the interior of door 12 and the external environment to prevent entry of contaminants and other debris into the interior of door 12. Blade portion 60 also cleans the outer surface of window 14 as it is extended and retracted. Sealing strip 22 may also be formed with apertures for insertion of a tool for opening clip 34 and easily removing strip 22 from flange edge 38.

Weatherstrip molding 20 is formed by an injection molding process of a plastic material which is preferably a thermoplastic or thermoset material, such as for example, polypropylene, an acetal, nylon or a nylon blend. An elongated mold is formed having an upper and lower shell (not shown) which have interior surfaces shaped to define first and second legs 24 and 26, web 28, and any desired end details such as end wall 40, mirror patch 16 or rear corner filler 42. In the embodiment shown in FIGS. 3 and 4, the lower shell of the mold (not shown) also defines the interior shape of retainer clip 34, and a side detail insert mold is used in conjunction with the upper and lower shells to form notch 32 and the outer facing surfaces of clip 34, including second channel 36 and projection 46. The thermoplastic or thermoset material is allowed to cure and harden or solidify within the mold, and is then removed from the mold to form a one-piece molding 20. Sealing strip 22 may be concurrently formed as is known in the art, and then affixed to first leg 24 of molding 20.

An alternative embodiment of the present invention is shown in FIGS. 6 and 7, in which first leg 124 of molding 120 is formed with a longitudinally extending ridge 164 which is formed in the mold when molding 120 is formed. Base 156 and its surrounding coating 158 are also formed with a similar longitudinally extending ridge 166, as shown in FIGS. 6 and 7. Ridge 166 allows the use of a separate mechanical fastener 168 for fastening sealing strip 122 to molding 120. Fastening means 168 may be formed as a staple or a stitch, and may be used in conjunction with an adhesive, and results in sealing strip 122 being more firmly secured to molding 120. Separate mechanical fasteners of this type have generally not been used in the art because of the possibility of scratching the glass of window 14 when it is extended or retracted. However, flocking 162 on ridge 166 prevents window 14 from contacting fastener 168, thus reducing the likelihood of scratching window 14.

A second alternative embodiment of the present invention is shown in FIGS. 8 and 9, in which retainer clip 270 are pre-formed and are then inserted into the mold before the thermoplastic or thermoset material is injected into the mold. Retainer clip 270 thus becomes integral with molding 220 when the thermoplastic or thermoset material cures around retainer clip 270. Retainer clip 270 may be formed having a variety of cross-sections, including one similar to retainer clip 34, or may be formed as shown in FIG. 9. Retainer clip 270 is formed with a base portion 272 and a leg 276 connected to base 272 by a web 274. Leg 276, and possibly base 272, may be formed with a lead-in surface 278 for facilitating insertion of molding 220 onto flange edge 38 of door 12.

Finally, in a third alternative embodiment, retainer clips may be pre-formed independently and then clipped onto molding 20 after it is removed from the mold. These retainer clips are also formed with a second channel for accepting and gripping flange edge 38 of door 12.

It should be understood that an unlimited number of configurations of the present invention can be realized. The foregoing discussion discloses and describes merely exemplary embodiments of the present invention. One skilled in the art will readily recognize from the discussion and from the accompanying drawings and claims that various changes and modifications can be made without departing from the spirit and scope of the invention, as defined in the following claims.

What is claimed is:

1. A weatherstrip for attachment to a vehicle having a flange edge at an interface between said edge and a movable window, comprising:

an elongated unitary molding formed of a single material by an injection molding process and having, in cross-section, a first and second leg joined together by a web to define a U-shape having a first channel between said first and second legs;

at least one retainer clip integrally formed with said molding and defining a second channel being smaller than said first channel for accepting said flange edge; and wherein said first leg is formed with a notch opposite said clip, such that said second channel is defined between a portion of said clip and a longitudinally spaced portion of said first leg.

2. The weatherstrip as set forth in claim 1, wherein said clip is formed with an interference fit with said first leg to allow for an enhanced attachment to said flange edge.

3. The weatherstrip as set forth in claim 1, wherein said molding is formed of thermoplastic.

4. The weatherstrip as set forth in claim 1, which further comprises a sealing strip affixed to said molding having a blade portion adapted to contact said movable window.

5. The weatherstrip as set forth in claim 4, wherein said blade portion is formed with a surface having a low friction coating for contacting said movable window.

6. A weatherstrip for attachment to a vehicle having a flange edge at an interface between said edge and a movable window, comprising:

a longitudinally extending molding formed by an injection molding process and having, in cross-section, a first and second leg joined together by a web to define a U-shape having a first channel between said first and second legs, at least one retainer clip integrally formed with said molding and defining a second channel being smaller than said first channel for accepting said flange edge;

which further comprises a sealing strip affixed to said molding having a blade portion adapted to contact said movable window; and wherein said first leg is formed with a first longitudinal ridge extending outwardly away from said second leg, said sealing strip being formed with a second longitudinal ridge similar to said first ridge and being affixed to said molding by fastening means located proximate to said second ridge, said second ridge being adapted to inhibit said window from contacting said fastening means.

7. A weatherstrip for attachment to a vehicle having a flange edge at an interface between said edge and a movable window, comprising:

an elongated unitary molding formed of a single material by an injection molding process and having, in cross-section, a first and second leg joined together by a web to define a U-shape having a first channel between said first and second legs;

at least one retainer clip integrally formed with said molding and defining a second channel being smaller than said first channel for accepting said flange edge; and wherein said clip is formed with a locking projection adapted to engage with a thrust bearing surface formed on said flange edge for inhibiting removal of said molding from said flange edge.

8. The weatherstrip as set forth in claim 7, wherein said thrust bearing surface is formed by an aperture through said flange edge.

9. A weatherstrip for attachment to a vehicle having a flange edge at an interface between said edge and a movable window, comprising:

an elongated molding formed by an injection molding process and having, in cross section, a first and second leg joined together by a web to define a U-shape and a first channel between said first and second legs, and at least one laterally and transversely extending end wall;

an elongated sealing strip having a base portion disposed adjacent to said first leg of said molding and having a blade portion extending from said base portion, said blade portion being adapted to contact said movable window when said weatherstrip is assembled in place on said flange edge, said molding and said base portion of said sealing strip each being formed with at least one matching notch; and at least one retainer clip disposed proximate to said matching notches and being formed to affix said molding to said flange edge, said retainer clip defining a second channel smaller than said first channel for accepting said flange edge.

10. The weatherstrip as set forth in claim 9, wherein said blade portion is formed with a surface having a low friction coating.

11. The weatherstrip as set forth in claim 9, wherein said clip is formed with a locking projection adapted to engage with a thrust bearing surface formed on said flange edge for inhibiting removal of said molding from said flange edge.

12. The weatherstrip as set forth in claim 11, wherein said thrust bearing surface is formed by an aperture through said flange edge.

13. The weatherstrip as set forth in claim 9, wherein said first leg is formed with a first longitudinal ridge extending outwardly away from said second leg, said sealing strip being formed with a second longitudinal ridge similar to said first ridge and being affixed to said molding by fastening means located proximate to said second ridge, said second ridge being adapted to inhibit said window from contacting said fastening means.

14. The weatherstrip as set forth in claim 9, wherein said molding is formed of thermoplastic.

15. The weatherstrip as set forth in claim 9, wherein said clip and said molding define a seam therebetween, said clip being pre-formed and inserted into a mold before said molding is formed, whereby said molding is molded around said clip and becomes integral with said molding.

16. A weatherstrip for attachment to a vehicle having a flange edge at an interface between said edge and a movable window, comprising:

an elongated unitary molding formed by an injection molding process and having, in cross section, a first and second leg joined together by a web to define a U-shape and a first channel between said first and second legs;

an elongated sealing strip having a base portion disposed adjacent to said first leg of said molding and having a blade portion extending from said base portion, said blade portion being adapted to contact said movable window when said weatherstrip is assembled in place on said flange edge; and at least one retainer clip integrally formed with said molding and adapted to affix said molding to said flange edge, said retainer clip defining a second channel smaller than said first channel for accepting said flange edge and having a projection adapted to engage a thrust bearing surface formed on said flange edge for inhibiting removal of said molding from said flange edge.

* * * * *